United States Patent [19]

Wertheim et al.

[11] Patent Number: 4,816,353

[45] Date of Patent: Mar. 28, 1989

[54] INTEGRATED FUEL CELL AND FUEL CONVERSION APPARATUS

[75] Inventors: Ronald J. Wertheim, Hartford; Richard A. Sederquist, Newington, both of Conn.

[73] Assignee: International Fuel Cells Corporation, South Windsor, Conn.

[21] Appl. No.: 862,953

[22] Filed: May 14, 1986

[51] Int. Cl.$^4$ .............................................. H01M 8/06
[52] U.S. Cl. ......................................... 429/19; 48/94; 422/191; 422/223; 429/26
[58] Field of Search ................ 422/191, 223; 423/651, 423/652, 653, 224 R, 230, 231, 244; 429/17, 20, 19, 26; 48/214 A, 94, 214 R, 196 A, 196 R; 208/247; 502/38, 51, 52

[56] References Cited

U.S. PATENT DOCUMENTS

| | | | |
|---|---|---|---|
| 2,580,068 | 12/1951 | Beekley et al. | 423/244 R |
| 3,655,448 | 4/1972 | Setzer | 429/20 |
| 4,098,339 | 7/1978 | Weisz et al. | 48/214 A |
| 4,200,682 | 4/1980 | Sederquist | 429/17 |
| 4,240,805 | 12/1980 | Sederquist | 48/214 R |
| 4,293,315 | 10/1981 | Sederquist | 48/94 |
| 4,442,078 | 4/1984 | Jalan et al. | 423/230 |
| 4,455,286 | 6/1984 | Young et al. | 423/244 R |
| 4,530,886 | 7/1985 | Sederquist | 429/26 |
| 4,642,272 | 2/1987 | Sederquist | 48/214 R |

OTHER PUBLICATIONS

Paper presented at the 1958 A.G.A. Operating Section Conference "The 'Onia-Gei' Process for Cyclic Catalytic Cracking of Liquid Hydrocarbons" by Gordon L. Calderwood.

Primary Examiner—David L. Lacey
Assistant Examiner—Joye L. Woodard

[57] ABSTRACT

An apparatus for making hydrogen from a hydrocarbon feedstock and steam using heat stored in a vessel followed by the regeneration of the vessel to restore the heat. Regeneration is done by preheating within the vessel a hydrogen purge gas and steam. Downstream of the conventional reform catalyst, the preheated gases are mixed with an oxygen containing gas so that they combust within the vessel in a fuel lean mode and heat material disposed in the vessel. This is the heat which is used in converting the hydrogen feedstock to hydrogen. The addition of steam in the regeneration process to recover the heat remaining in the vessel following the hydrogen make cycle simplifies reactor bed design and improves operational flexibility. Incorporation of a regeneratable sulfur absorber in the vessel facilitates the removal of up to 90% of the feedstock sulfur.

1 Claim, 2 Drawing Sheets

INTEGRATED FUEL CELL AND FUEL CONVERSION APPARATUS

CROSS-REFERENCE TO RELATED APPLICATION

Attention is directed to commonly assigned, copending application Ser. No. 812,212 filed Dec. 23, 1985, now U.S. Pat. No. 4,642,272; entitled "Integrated Fuel Cell and Fuel Conversion Apparatus" the disclosure of which is incorporated by reference.

TECHNICAL FIELD

This invention relates to methods and apparatus for producing a hydrogen containing gas from a hydrocarbon feedstock.

BACKGROUND ART

In the prior art, producing a hydrogen containing gas, such as hydrogen, from a hydrocarbon feedstock is typically accomplished by passing the feedstock (and steam if the conversion process is steam reforming) through catalyst filled tubes disposed within a furnace. Fuel and air are burned within the furnace to provide heat for the catalytic reaction taking place within the tubes. In order to improve the efficiency of such apparatus some efforts have been directed to improving the uniformity of heat distribution to the tubes within the furnace while minimizing the amount of energy used to produce each unit of hydrogen containing gas. For example, in commonly owned U.S. Pat. No. 4,098,587 to R. A. Sederquist et al the reaction tubes are clustered closely together in a furnace, with baffles and sleeves surrounding each tube to improve heat transfer from the combusting gases in the furnace into the catalyst beds. Each catalyst bed is annular; and a portion of the heat in the product gases leaving the bed is returned to the bed to further the reaction process by flowing these product gases through a narrow annular chamber along the inside wall of the annular catalyst bed. The example given in column 7 of the Sederquist et al patent indicates that an overall reactor thermal efficiency of 90% was achieved with the apparatus described therein. Other commonly owned patents of a somewhat similar nature are U.S. Pat. Nos. 4,071,330; 4,098,588; and 4,098,589.

One drawback of the approaches taken in all of the foregoing patents is that the heat for the conversion process is still provided indirectly by means of heat transfer through reactor walls. Also, a considerable amount of heat energy leaves the furnace with the furnace exhaust gases. Although some of this heat can be recovered and used for other purposes, such as producing steam, it would be more beneficial if this heat energy could be used in the conversion process.

Another process and apparatus for the catalytic conversion of hydrocarbons by steam is shown and described in a paper titled "Conversion Catalytique et Cyclique Des Hydrocarbures Liquides et Gazeux" published by Societe Onia-Gegi. That system comprises a first vessel including a first heat exchange chamber, followed by a second vessel containing a catalyst bed, followed by a third vessel including a second heat exchange chamber. In operation, steam is introduced into the first vessel and is preheated as it passes through hot checkerbricks disposed within the chamber. Downstream of the checkerbricks the preheated steam is mixed with a hydrocarbon feedstock and the mixture passes into the second vessel containing a heated catalyst bed by means of a conduit interconnecting the two vessels. Conversion takes place as the mixture passes through the heated catalyst bed. Hot conversion products leave the second vessel and enter the third vessel, whereupon the hot conversion products give up heat to checkerbricks which are disposed therein. The conversion products may then be stored or used directly.

When the temperatures in the first heat exchange chamber and in the catalyst bed are too low to convert the feedstock, the apparatus is switched to a regeneration cycle. In the regeneration cycle air is introduced into the third vessel and is preheated as it passes through the checkerbricks disposed therein which were heated during the conversion cycle. Downstream of the checkerbricks a fuel, such as oil, is mixed with the preheated air and combusts. In order to keep combustion temperatures within acceptable limits, air in excess of that required for stoichiometric combustion is used. The hot combustion products are directed into the second vessel and pass through the catalyst bed, therein heating the same. This is the heat which is used during the conversion cycle. Because of the excess air, the catalyst bed is oxidized, although this is not desirable. (During the conversion mode of the cycle the oxidized catalyst is reduced back to the metal; this requires use of some of the hydrogen being manufactured, and has a negative impact on efficiency).

After passing through the catalyst bed the combustion products are directed into the first vessel and give up additional heat to the checkerbricks disposed therein. This is the heat which is used to preheat the steam during the conversion cycle.

Commonly owned U.S. Pat. No. 3,531,263 describes an integrated reformer unit comprised of a can-type structure which houses the reaction components of a system for converting hydrocarbon feedstocks to hydrogen. This compact apparatus, in one embodiment, comprises a center tube containing a volume of reform catalyst, followed immediately by a region of heat transfer packing material, followed by a volume of shift conversion catalyst. Surrounding the tube over its entire length is an annular passage. Air is introduced into the end of the annular passage adjacent the shift catalyst volume of the center tube. It is mixed with fuel approximately adjacent the interface between the heat transfer packing material and the reform catalyst. The fuel and air burn and travel further downstream around the outside of that portion of the center tube carrying the reform catalyst. Simultaneously a mixture of a hydrocarbon feedstock and water enter the center tube at the reform catalyst end. Steam reforming takes place within the catalyst bed with the heat being provided by the hot combustion products flowing countercurrent in the annulus around the outside of the tube. As the reform products leave the catalyst bed they give up heat to the heat transfer packing material in the next following region. This heat is used to preheat the air flowing around the outside of this heat transfer region before the air is mixed with the fuel and burned. The cooled products from the packing material region then pass through the shift conversion catalyst volume whereupon carbon monoxide present therein is converted to additional hydrogen and carbon dioxide. This reaction is exothermic, and the heat produced thereby preheats the air flowing around the outside of the tube.

While the foregoing apparatus is compact, and careful attention has been given to the overall heat balance and heat requirements of the hydrogen generating reaction, most heat transfer is still indirect and a significant amount of the heat energy generated within the apparatus, leaves the apparatus with the combustion exhaust and the reform products.

Commonly owned U.S. Pat. Nos. 4,200,682; 4,240,805; and 4,293,315, the disclosures of which are hereby incorporated by reference also relate to methods and apparatus for producing a hydrogen containing gas from a hydrocarbon feedstock. In particular, in U.S. Pat. No. 4,200,682 a continuous supply of hydrogen is provided to a fuel cell from a pair of reaction vessels by making hydrogen in one of the vessels while simultaneously regenerating the other vessel, and then reversing the function of the vessels. In the step of making hydrogen, a hydrocarbon feedstock and steam flows into a vessel and is cracked and steam reformed using heat which was generated during the regeneration cycle and stored in packing material. The step of regenerating the vessel includes directing the fuel cell electrode exhaust and an oxygen containing gas into the vessel, preheating the fuel electrode exhaust and oxygen containing gas separately within the vessel, and mixing these preheated gases and combusting them within the vessel. The step of preheating is accomplished using the heat stored within material disposed within the vessel during the making of hydrogen. Although this cyclic reformer system functions well, the regeneration was typically accomplished by passing the oxygen containing gas through conduits to separate the oxygen from the fuel electrode exhaust during the preheat stage. However, the use of these conduits can add engineering design problems and additional cost.

Accordingly, there has been a constant search in this field of art for cyclic reformer systems that incorporate alternative regeneration systems.

DISCLOSURE OF THE INVENTION

It is one object of the present invention to provide a novel, highly efficient method and apparatus for converting a hydrocarbon feedstock into a hydrogen containing gas.

Yet another object of the present invention is a method and means for efficiently integrating a fuel cell with an apparatus for converting a hydrocarbon feedstock to hydrogen.

In a catalytic reaction vessel, a hydrogen containing gas is made from a hydrocarbon feedstock and steam using heat stored in the vessel and the vessel is then regenerated to restore the heat used, the regeneration being done by preheating a hydrogen purge gas and steam and mixing these preheated gases with an oxygen containing gas so that they combust within the vessel in a net fuel lean mode and heat material disposed therein.

Hydrogen purge gas, as that phrase is used herein, is defined as a gas containing at least some hydrogen for the purpose of combusting with the oxidant which is introduced in the reaction vessel during regeneration. The hydrogen purge gas may also contain other combustibles, such as carbon monoxide and methane. Heavier hydrocarbons are undesirable (but not necessarily intolerable) since they could form carbon upon cracking. The purge gas may also include noncombustibles, such as carbon dioxide, water vapor and nitrogen. Examples of hydrogen purge gases are: pure hydrogen; effluent from the fuel or anode compartments of acid, base or molten carbonate fuel cells; and the purge effluent from well known pressure swing absorption type hydrogen purification systems.

In a preferred embodiment hydrogen is the desired product gas. The reaction vessel has three zones arranged in sequence. During the making of the hydrogen (i.e., make mode) the hydrocarbon feedstock and steam are preheated within the first zone which is filled with material which was heated during regeneration of the reaction vessel. Gasification (i.e., cracking and reforming), of the feedstock and steam mixture takes place within the next following second zone of heated material which includes a region of reform catalyst. The gas so produced is then cooled in a lower temperature third zone, thereby increasing the temperature of the material within the third zone. The heat used in making the hydrogen is restored by regenerating the reaction vessel (i.e., regeneration mode). Regenerating is accomplished by preheating a hydrogen purge gas and steam using the sensible heat stored during the make mode in material disposed in the vessel. These gases are mixed with an oxygen containing gas so that they combust within the second of the above-mentioned zones to reheat the material in that zone. Combustion products from the second zone are then cooled by passing them through the first zone, whereby material in the first zone is reheated.

The present invention is very compact and highly efficient. All of the energy expended in the method is utilized to directly convert the feedstock to the desired hydrogen containing gas, which is usually hydrogen. Virtually all heat transfer is direct, which eliminates losses typically associated with indirect heating and cooling. Preheating of both hydrogen purge gas and steam without using an external heat source also increases efficiency by recovering the maximum amount of heat from the product gas of the make mode. Maximizing preheating minimizes the amount of hydrogen purge gas which must be burned to provide process heat, which also increases efficiency. Thermal efficiencies of 95% and perhaps higher can be obtained by the method of the present invention.

Combining steam with the hydrogen purge gas during regeneration is also an important aspect of the present invention. The additional heat capacity of steam eliminates the need for passing the oxygen containing gas through the third zone in order to recover the heat remaining in the vessel following the hydrogen make cycle. This in turn eliminates the need for conduits to separate the oxygen containing gas from the hydrogen purge gas.

Another aspect of this invention is the use of a regenerable sulfur absorber to remove up to 90% of the feedstock sulfur. During the make mode, the sulfur absorber combines with the feedstock sulfur and during the regeneration mode the sulfur absorber is regenerated.

If a continuous supply of a hydrogen containing gas is required, two separate reaction vessels may be used simultaneously, with the first vessel making the hydrogen containing gas while the second is being regenerated, and then switching the mode of operation of each vessel so that the first is being regenerated while the second is making the hydrogen containing gas.

This invention is particularly useful for supplying hydrogen to the anode of a fuel cell. In a preferred arrangement, while one reaction vessel is supplying the hydrogen, the other vessel may be regenerated using the anode exhaust as the hydrogen purge gas.

The foregoing and other objects, features and advantages will be apparent from the specification, claims and from the accompanying drawings which will illustrate an embodiment of the invention.

BEST MODE FOR CARRYING OUT THE INVENTION

Figure 1:
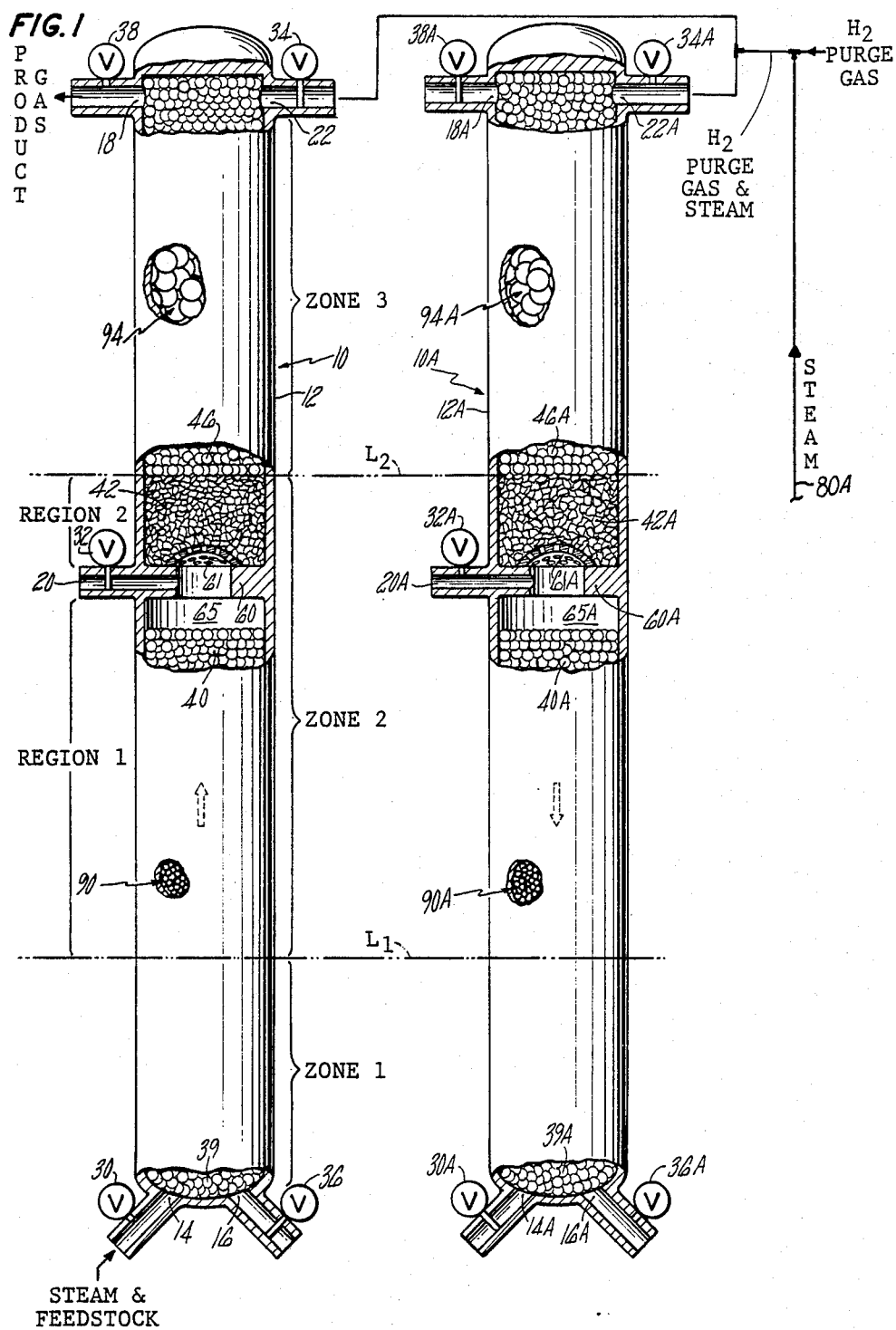
FIG. 1 is a front view, partly broken away, of a pair of catalytic reaction vessels according to the present invention.

As an exemplary embodiment of the present invention consider the pair of reactors 10 and 10A shown in FIG. 1, which are designed to produce hydrogen. These reactors are identical. Corresponding elements of the two reactors are given the same reference numerals, except that the numerals are followed by the letter A for elements of the right-hand reactor. The reactors 10 and 10A operate in conjuction with each other, such that while one is in the "make mode" (ie., making hydrogen) the other is in the "regeneration mode" (i.e., being regenerated). After a suitable period of time the reactors switch modes. Thus, at any point in time, one of the reactors is making hydrogen while the other reactor is being regenerated. Of course, if a continuous flow of hydrogen gas is not required, then only a single reactor could be used. Hereinafter the output from the reactor in the make mode is sometimes referred to as the "product gas" or "reform products". For the purposes of explanantion, the reactor 10, on the left, is considered to be in the make mode, and the reactor 10A on the right is in the regeneration mode.

The reactor 10 is shown as comprising a cylindrical reaction vessel 12. At the bottom end of the vessel is a steam and hydrocarbon feedstock inlet 14 and a combustion products outlet 16. At the top end of the vessel is a product gas outlet 18 and a hydrogen purge gas and steam inlet 22. On the side of the vessel is an oxygen containing gas inlet 20. In this embodiment, the oxygen containing gas is air. Flow into inlets 14 and 20 is controlled by valves 30 and 32, respectively. Flow into inlet 22 is controlled by valve 34. Flow from the outlets 16 and 18 is controlled by valves 36 and 38 respectively. As shown in the drawing, during the make mode, the valves 30 and 38 are open while the valves 32, 34, and 36 are closed.

From an operational point of view, the vessel 12 may be thought of as comprising three zones arranged in sequence or series gas flow relationship within the vessel. The zones are labeled zone 1, zone 2, and zone 3 in the drawing. Imaginary lines $L_1$ and $L_2$ have been drawn in for the purpose of visualizing and discussing where one zone ends and the next begins, although in actual operation the point where one zone ends and the next begins cannot be so precisely defined.

During the make cycle a mixture of steam and hydrocarbon feedstock enters zone 1 of the reactor vessel 12 via the inlet 14. Zone 1 is filled with an inert packing material 39, such as alumina, which has heat stored therein from the regeneration cycle. The mixture of steam and feedstock entering zone 1 are at a lower temperature than the temperature of the packing material, and thus heat is transferred to the mixture from the packing material as the mixture passes through zone 1.

The hydrocarbon feedstock may be either in the form of a gas, such as natural gas, or in the form of a vaporized liquid hydrocarbon, such as naptha, No. 2 heating oil, or the like. For those hydrocarbon feedstocks which may be difficult to vaporize, the feedstock may preferably be injected or sprayed into zone 1 or at the exit of zone 1 using the sensible heat in the preheated steam and heat stored in the packing to achieve complete vaporization.

The end of zone 1 is considered to be that location within the vessel 12 wherein the steam and feedstock mixture have been heated to a temperature high enough such that cracking and/or reforming of the feedstock begins to occur. At this point the mixture is considered to be entering zone 2. Thus, zone 1 may be thought of as a preheating zone during the make mode. Within zone 2, cracking and reforming of the feedstock takes place. The temperature at the inlet of zone 2 will probably be somewhere between 370° C. and 540° C., depending upon the feedstock being used and the material within the reactor (i.e., inert or catalytic). In this embodiment, zone 2 is divided into two regions labeled region 1 and region 2. Region 1 is immediately upstream of and in series gas flow relationship to region 2. Disposed within region 2 is reform catalyst 42. The reform catalyst will typically be a metal supported on an inert ceramic material. For example, a common reform catalyst is nickel supported on alumina. Disposed within region 1 is a packing material and preferably a nonoxidizable reform catalyst. The catalyst or packing material 40 in region 1 may be, for example, a noble metal catalyst supported on a refractory support like alumina, or magnesium oxide pellets, or may be the same as the material 39 in zone 1.

It is preferred that region 1 comprises in addition to the above described packing and/or catalyst material a sulfur absorbing (sulfur scrubber) material 90 in order that sulfur can be removed from the hydrogen feedstock undergoing cracking, reforming and conversion of its organic sulfur compounds to hydrogen sulfide. This sulfur absorber material can work in conjunction with additional sulfur absorber material downstream in zone 3 to produce a hydrogen fuel low in sulfur (up to 90% of the original sulfur in the feedstock removed). The sulfur absorbing concept is matched with the regenerable reformer concept yielding a regenerable sulfur absorbing reformer. This is unique in that a significant portion of the feedstock sulfur can be removed as part of the hydrogen generation process rather than in a separate regenerable sulfur removal process following the hydrogen generation process. The remaining sulfur in the hydrogen fuel gas can be removed easily in a small and very effective low temperature zinc oxide polisher or final scrubber located downstream. Further operation of a separate regenerable sulfur scrubber over the short cycle time typically employed in this type of reforming process, (e.g. about 2 to about 10 minutes) would result in unacceptable hydrogen and steam purge losses required to separate the hydrogen fuel from the oxygen containing regenerant. A typical regenerable sulfur scrubber would operate over a cycle of several hours where purging would result in an insignificant loss from the system compared to the total throughout between purges. The purge losses are easily eliminated in this regenerable reformer system by proper sequencing of hydrocarbon feedstock and regeneration air. By terminating fuel flows a few seconds before the end of process steam flow during the make, and terminating air one or two seconds before the end of regeneration, the reaction vessels can be switched (without loss of fuel or unburned purge gas via the burner exhaust) and without introduction of significant air into the product or reform gas. A single product tank and sparger can be used to smooth out product gas composition changes during the switchover of reaction vessels. Lastly, the relative shortness of the reformer and regeneration cycle times (e.g. about 2 to about 4 minutes each) combined with the heat capacity of the beds does not allow the sulfur absorbent beds to overheat, thereby eliminating the possibility of bed overheating and sintering which could cause a loss of active surface area and sulfur removal performance.

The sulfur absorbing material in region 1 comprises a regenerable sulfur absorber such as oxides of zinc, oxides of iron, zinc ferrite, oxides of copper, oxides of chromium, oxides of vanadium, oxides of tungsten or mixtures thereof such as described in U.S. Pat. No. 4,442,078, the disclosure of which is hereby incorporated by reference. It is especially preferred to use zinc oxide because the material is converted to the sulfide and is regenerated back to the oxide but is not reduced to the metallic state by hydrogen or fuel which would cause a loss in hydrogen product during the make cycle. Within Region 1, the sulfur absorbing material is preferably disposed within a region wherein the temperature is about 500° C. to 700° C. A temperature of at least 500° C. is required to initiate cracking of the feedstock and release of feedstock sulfur compounds so that they may be reacted with the sulfur absorbing material. Above 700° C., the absorbent becomes less effective as equilibrium limits the amount of absorbed sulfur. An exemplary sulfur absorbing reaction is detailed emprirically below.

$$ZnO + H_2S \rightarrow ZnS + H_2$$

The packing material 40 will be, on average, considerably hotter than the material in zone 1 as a result of combustion taking place in region 1 during the regeneration mode. As the effluent from zone 1 travels through region 1 of zone 2, the heat needed for gasification is provided by the sensible heat stored in the material 40. The temperature of the effluent from region 1 is sufficiently high to provide the heat required for the small amount of additional reforming of the hydrocarbon feedstock (within region 2) without adding heat from external sources.

The end of zone 2, which is the beginning of zone 3, is considered to be the location within the reaction vessel 12 wherein no further substantial gasification or reforming takes place. Zone 3, in this embodiment, contains inert packing material, and is a cooling zone during the make mode. As the effluent from zone 2 is cooled, it transfers heat to inert packing material disposed in zone 3. The length and volume of zone 3 is preferably selected so as to cool the effluent from zone 2 to a preselected temperature. The cooled effluent is then exhausted from the reaction vessel 12 via the outlet 18. This effluent is the reactor product gas. In addition to hydrogen it contains carbon monoxide, carbon dioxide, methane and water.

Zone 3 may include a region of high temperature shift catalyst (iron and chrome oxides) in place of a portion of the inert packing material. Within the shift catalyst region carbon monoxide and water in the effluent from zone 2 would combine to produce additional hydrogen and carbon dioxide in a manner well known to those skilled in the art. This is very desirable when the product gas made in the reactor 10 is to be used in a phosphoric acid electrolyte fuel cell which cannot tolerate more than a few percent of carbon monoxide. If desired the carbon dioxide could be removed downstream of the reactor using well known scrubbing devices; but this is not necessary if the product gas is to be used in a phosphoric acid electrolyte fuel cell.

It is preferred that zone 3 also contains sulfur absorbing material 94 similar to that of region 1 described above. This second area of sulfur absorbing material in conjunction with that described for region 1 will provide substantial sulfur absorbing capacity (e.g. up to 90% of the sulfur contained in the hydrocarbon feedstock). As before, a regenerable sulfur absorber will complement the regenerable nature of the cyclic reformer. Thus, it is preferred that the sulfur absorber comprises oxides of zinc, oxides of iron, iron ferrite, oxides of chromium, oxides of copper, oxides of vanadium, oxides of tungsten or mixtures thereof. It is especially preferred to use zinc oxide because this material will not catalyze the reaction of $H_2$ with $O_2$ (if a small amount of air or $O_2$ is used) for regeneration and allow the reaction of ZnS with $O_2$ to regenerate the ZnS back to ZnO before the eventual recombination of $H_2$ with $O_2$ at the higher temperatures in zone 3. Within zone 3, the sulfur absorbing material is preferably disposed within a region wherein the temperature is about 400° C. to about 700° C. The temperature should be above about 400° C. to initiate the regeneration reaction with $O_2$ and below about 700° C. to maximize the absorption reaction with hydrogen sulfide. Since a small amount of oxygen (preferably equal or less than 0.5% to about 1.0% to limit the early combustion of $H_2$ purge gas since unused $O_2$ and $H_2$ will react at about 700° C.) must be admitted to zone 3 during regeneration along with the regeneration steam and $H_2$ purge gas to help regenerate the absorbent, the maximum temperature must be limited to avoid recombination of the $O_2$ with $H_2$ before the $O_2$ has regenerated the absorbent material. Otherwise, combustion starts to occur. This temperature is about 700° C.

Turning now to the regeneration cycle which is occurring in reactor 10A, the valves 30A and 38A are closed and the valves 32A, 34A, and 36A are open. A hydrogen purge gas (i.e. anode exhaust, fuel electrode exhaust) which had been mixed with steam (e.g. waste stack steam) from conduit 80A enters the reaction vessel 12A via the inlet 22A. The combined gases travel through the inert packing material 46A in zone 3 picking up heat therefrom. The combined hydrogen purge gas and steam molar flow is selected so as to effectively cool the packing material that was heated during the make cycle. Thus, an amount of steam is introduced that has a heat capacity sufficient in conjunction with the purge gas to cool the make stream to the temperature desired for the particular application. The combined flow is typically about 0.8 to about 1.2 mole per mole of product gas. Below about 0.8 mole per mole, there will be insufficient cooling to recover the process heat in the reform products resulting in the reform products exiting at too high a temperature. Above about 1.2 mole per mole, there is too much cooling resulting in the reform products and reformer being cooled too much. Preferably, about 0.9 to about 1.0 mole per mole is used as this provides sufficient cooling in an efficient manner. With fuel cell applications, the molar flow should be sufficient to cool the make stream from a temperature range of about 870° C. to about 1100° C. to a temperature range of about 200° C. to about 315° C. The packing material 46A is thereby cooled somewhat during the regeneration cycle. It is, of course, reheated during the make cycle when it performs the function of cooling the product gases.

During the regeneration cycle, the sulfur absorber material described above present in zone 3 is regenerated. An exemplary regeneration reaction is detailed below.

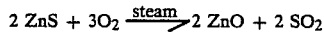

Oxygen can be introduced in small quantities by adding a small amount of air (preferably euual or less than about 0.5% to about 1.0% $O_2$) to the regeneration steam which is mixed with the purge gas. This oxygen can help regenerate the absorbent such as the zinc oxide in the above equation before the oxygen and hydrogen eventually combine at the higher temperatures in the hotter portions (at or above 700° C.) of zone 3. It is preferable to react $O_2$ with sulfide before $O_2$ reacts with $H_2$.

Air (optionally preheated through heat exchange with combustion product exhaust) enters the vessel 12A via the valve 32A. The air enters from the inlet 20A located between regions 1 and 2. Regions 1 and 2 are separated by a cylindrical ceramic (refractory) insert or wall 60 through which the air enters, and a catalyst support plate 61 which retains catalyst 42 in region 2. A typical insert 60 material is alumina. A typical catalyst support plate 61 material comprises alumina or fully stabilized zirconia. The air mixes with the hydrogen purge gas/steam from zone 3 which has just passed through the reform catalyst in region 2 and combusts in area 65. Air addition may also be staged (introduced at various points) to allow combustion at two or more points (areas) within region 1. This produces regions of different combustion stoichiometry or fuel leanness in region 1 which is advantageous because different catalyst materials can be used at the different points. The catalyst can be selected which is best suited for operation at each stoichiometry (i.e., hydrogen rich over a convention reform catalyst and hydrogen lean over the non-oxidizable catalyst). If the catalyst were to become oxidized, this would result in loss of some of the hydrogen being manufactured (during the make cycle) as the catalyst is re-reduced, hence less efficiency. The net quantity of air entering should be equal or have just slightly more than the stoichiometric amount of oxygen required to completely burn the hydrogen and any other combustibles contained in the hydrogen purge gas. This assures a hydrogen lean operation mode which completely combusts the hydrogen in an efficient manner. As combustion occurs, and as the combustion products travel through zone 2 and zone 1 and are eventually exhausted via the outlets 16A, heat is transferred to and stored in the packing material 40A and 39A. It is this stored sensible heat within the reaction vessel which is used to preheat, crack and reform the hydrocarbon feedstock during the reactor's make mode of operation.

During the regeneration cycle, the sulfur absorber material described above present in zone 2, region 1 can be regenerated. An exemplary regeneration reaction is detailed below.

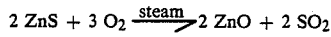

Surprisingly, the concepts of a cyclic reformer and a regenerable sulfur absorber material complement each other as the conditions present in region 1 of zone 2 for the regeneration of the cyclic reformer are those reaction conditions that regenerate the sulfur absorbing material. Specifically, residual oxygen is present subsequent to the regeneration combustion process and steam is also present in the regeneration gases.

The fuel processing apparatus of the present invention can provide the fuel for a fuel cell or for a stack of fuel cells. One possible fuel cell system is shown schematically in FIG. 2. During operation, a hydrocarbon feedstock and steam from any suitable source 212, (preferably steam produced by the cooling of a phosporic acid fuel cell stack since it is an efficient use of cell stack waste heat) passes through an open valve 214 and enters the reform reactor 200 which is in the make mode. The feedstock and steam are converted to hydrogen within the reactor 200. The hydrogen containing reform gas leaves the reactor 200 via the conduit 218 and is directed to the anode electrode (fuel electrode(s)) 206 at the fuel cell 204 (or fuel cell stack). Anode exhaust (fuel electrode exhaust), which contains unconsumed hydrogen leaves the cell(s) via a conduit 224, mixes with additional available steam from cooling the fuel cell stack which enters conduit 224 from conduit 230 and is directed into the reactor 202 by way of conduit 226. The anode exhaust (hydrogen purge gas) and steam are used for regeneration (and optional sulfur regeneration) as hereinbefore described. Air from a suitable source 228 passes through an open valve 230 and enters the reactor 202 via a conduit 232. Within the reactor 202 the air from conduit 232, the anode exhaust from conduit 226 combine and burn (steam being inert) in accordance with the present invention as hereinabove described, and the combustion products are exhausted from reactor 202 through open valve 236. Those skilled in the art will readily comprehend that the system described above can be reversed such that the functions of the two reactors are switched in a like manner to that described in commonly-assigned U.S. Pat. No. 4,200,682.

EXAMPLE

Figure 2:
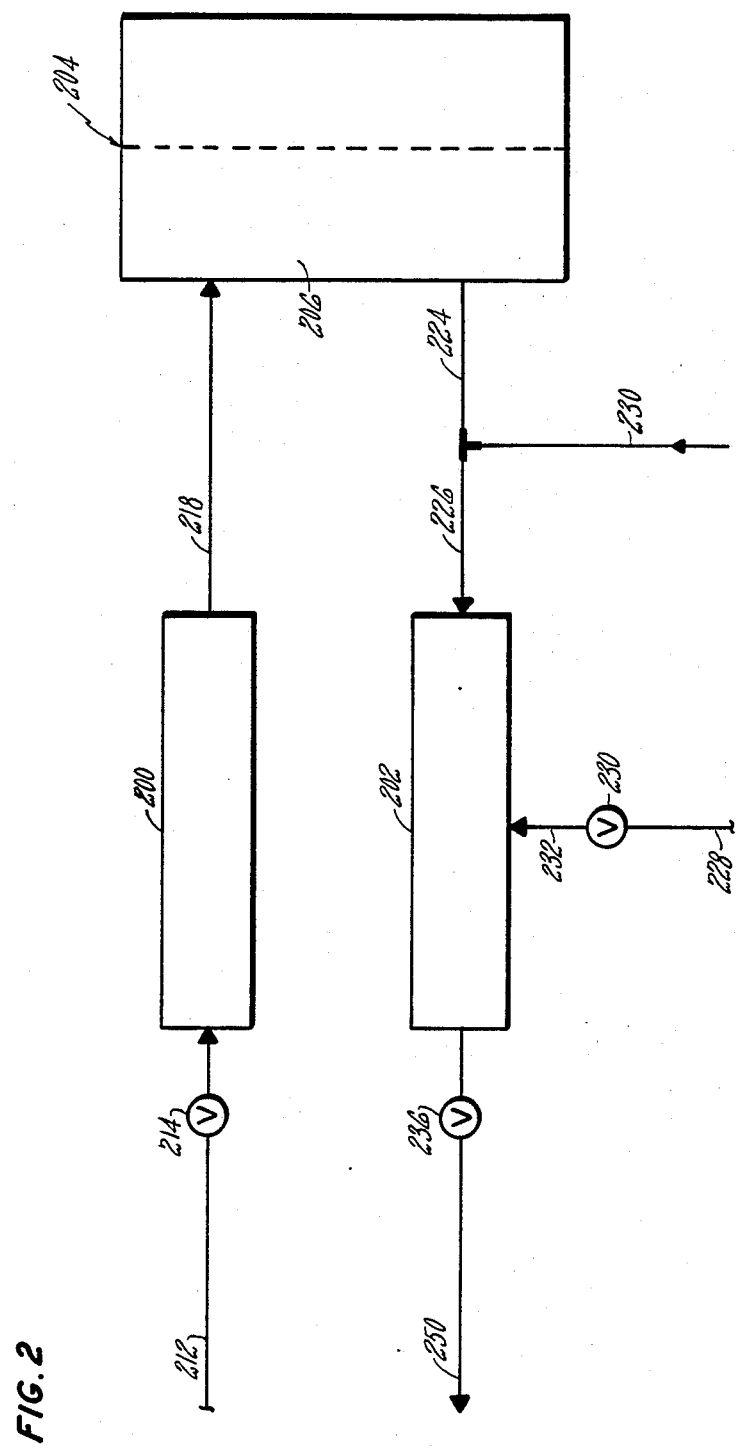
FIG. 2 is a schematic diagram of catalytic reaction vessels integrated with fuel cells in accordance with the present invention.

Referring to FIG. 2, a mixture of number 2 fuel oil (chemically represented as $(CH_{1.8})_n$ with, for this example, n equal to 1) and 3 moles of $H_2O$ is fed at a temperature of $-200°$ C. to the make reactor 200 via conduit 212. About 5 moles of reform products consisting principally of CO, $CO_2$, $H_2$ and $H_2O$ are produced achieving a temperature of 980° C. before cooling in cooling zone 3 (described previously in FIG. 1) and exiting reactor 200 via conduit 218 at a temperature of 250° C. The heat capacity of these reform products is approximately 45 calories per degree centigrade. These reform products are fed to a fuel cell anode (fuel electrode) where 2.2 moles of $H_2$ are consumed electrochemically to produce electrical power. These reform products, now partially depleted of $H_2$ exit the fuel cell anode (fuel electrode exhaust) via conduit 224 at a temperature of 200° C. with a heat capacity of approximately 26 cal/° C. This heat capacity would be insufficient to adequately cool the packing material in zone 3 heated in the process of cooling down the 45 cal/° C. reform product from 980° C. to 250° C.

In this example, the remaining approximately 19 cal/° C. of heat capacity is provided by approximately 2 moles of steam in conduit 230. This steam (as well as the 3 moles of process steam in conduit 212) is preferably obtained via steam separation from a 10% quality steam/water mixture used to cool a phosphoric acid fuel cell stack 204. Thus, of the approximately 5 moles of steam produced by the waste heat of the phosphoric acid cell stack, 3 moles (60%) are consumed in the make mode and 2 moles (40%) are used to provide additional needed heat capacity in the regeneration mode.

The fuel conversion apparatus of the present invention can also be utilized for the generation of hydrogen for other applications such as the chemical process industry. Purge gas containing hydrogen from a chemical process or a portion of the hydrogen containing gas produced by the make reactor (approximately 25%) can be used for the regeneration process. This purge gas combined with steam (which is typically readily available as waste at most chemical processing facilities) can be used to cool the reform product gas and provide the heat required for the steam reform process. Since heat is transferred in this process by direct contact with catalysts and packings, rather than through the walls of a tubular metallic reactor as is practiced in conventional steam reforming furnaces, the process is capable of operation at temperatures and pressures above conventional systems (using an internally lined vessel with cast insulation). This allows the achievement of high fuel conversion at high pressure with reduced syngas compression costs for methanol and ammonia production.

This system can achieve the same high efficiencies as previous cyclic reformer systems without the use of cooling air tubes (conduits). These tubes are expensive to manufacture, difficult to manifold and assemble into the reactor and complicate filling of the reactor with catalyst and packing materials. These tubes are also subject to a temperature cycle and a varying gas composition environment which can lead to distortion, corrosion and reduced tube life. Operation at high temperatures (which is required to achieve high fuel conversion with high sulfur content fuels) further compounds these problems. The elimination of air tubes has been accomplished by introducing steam in a system operating in an efficient net hydrogen lean mode. The steam increases the cooling capacity of the regenerating hydrogen purge gas stream. Sufficient cooling is required to lower the temperature of the hydrogen make stream and recover the heat remaining in the cyclic reformer bed following the hydrogen make cycle to optimize cyclic reformer performance.

In addition, this system can have advantages over commonly assigned application Ser. No. 812,212 wherein the combustion products were recycled to provide additional cooling capacity. This system utilizes a readily available material to provide cooling. The steam is inert to the regeneration cycle reactions. This system can be operated in a fuel lean mode which is typically more efficient because in a fuel rich mode all the $H_2$ by definition is not combusted. This system simplifies the design as it eliminates the recycle pump and a subsequent catalytic burner device which would be needed to combust residual hydrogen in a fuel rich system. In summary, this invention makes a significant contribution to the cyclic reformer art by simplifying reactor bed design and improving operational flexibility.

Finally, this system can operate using a regenerable sulfur absorber. This system can remove up to 90% of the feedstock sulfur while retaining both its regenerable reformer and regenerable sulfur absorber characteristics. Namely, the regenerable sulfur scrubber can be incorporated into this regenerable reformer combining two processes in one reducing the number of separate process components and avoiding the purge losses associated with a separate regenerable scrubber operating at short cycle times.

It should be understood that the invention is not limited to the particular embodiment shown and described herein, but that various changes and modifications may be made without departing from the spirit or scope of this concept as defined by the following claims.

We claim:

1. A fuel cell system comprising:
   (a) a fuel cell including a fuel electrode, an oxygen electrode, and an electrolyte disposed therebetween;
   (b) a pair of reaction vessels, each being adapted to alternately make a hydrogen containing gas and to be regenerated, each of said reaction vessels having an upstream end and a downstream end, each vessel having disposed therein, in sequence from its upstream to downstream end, a first volume of inert packing material containing no reform catalyst, a second volume of material including a first region comprising a regenerable sulfur absorber of oxides of zinc, oxides of iron, zinc ferrite, oxides of chromium, oxides of copper, oxides of vanadium, oxides of tungsten or mixtures thereof and a second region downstream of said first region comprising reform catalyst material, and a third volume of material;
   (c) means for alternately directing a hydrocarbon feedstock and steam first into said first volume of one of said vessels and then into said first volume of the other of said vessels;
   (d) means for directing the hydrogen containing gas produced in the one of said vessels receiving said feedstock and steam into said fuel electrode of said fuel cell and for directing the exhaust from said fuel electrode and steam into said third volume of material in the other of said vessels;
   (e) means for directing an oxygen containing gas into said vessels including an inlet means upstream of said second region of reform catalyst; and
   (f) each of said vessels including combustion products outlet means at its upstream end for exhausting combustion products therefrom during regeneration of each vessel.

* * * * *